(12) United States Patent
Wang

(10) Patent No.: US 11,466,754 B2
(45) Date of Patent: Oct. 11, 2022

(54) CHAIN STRUCTURE OF BICYCLES

(71) Applicant: Yung-Sheng Wang, New Taipei (TW)

(72) Inventor: Yung-Sheng Wang, New Taipei (TW)

( * ) Notice: Subject to any disclaimer, the term of this patent is extended or adjusted under 35 U.S.C. 154(b) by 281 days.

(21) Appl. No.: 17/010,915

(22) Filed: Sep. 3, 2020

(65) Prior Publication Data

US 2021/0079980 A1 Mar. 18, 2021

(30) Foreign Application Priority Data

Sep. 16, 2019 (TW) ................................ 108212204

(51) Int. Cl.
*F16G 13/06* (2006.01)
*B62M 9/04* (2006.01)
*B62M 9/00* (2006.01)

(52) U.S. Cl.
CPC ............... *F16G 13/06* (2013.01); *B62M 9/04* (2013.01); *B62M 2009/005* (2013.01)

(58) Field of Classification Search
CPC .... F16G 13/06; B62M 9/04; B62M 2009/005

USPC ......................................................... 474/230
See application file for complete search history.

*Primary Examiner* — Gene O Crawford
*Assistant Examiner* — Emily R Kincaid

(57) ABSTRACT

The present invention is a chain structure of bicycles, which comprises a plurality of rollers, a plurality of chain sheets and a plurality of chain rollers. Wherein the rollers define a mounting space. Each chain sheet comprises a chain body, a first pivot joint part extending from one end of chain body and to be arranged in the mounting space, a second pivot joint part horizontally extending from the other end of chain body, the second pivot joint part is installed on the roller with the first pivot joint part, wherein the first pivot joint part is in a horizontal position different from chain body, the first pivot joint part defines a rotation space for placing the second pivot joint part of another chain sheet, so that the first pivot joint part and second pivot joint part can rotate a preset angle in the rotation space. When the chain sheets are combined with rollers respectively, the chain bodies remain on the same plane, the chain roller penetrates the second pivot joint part and the first pivot joint part respectively for connecting the roller to the chain sheets on both sides of roller. Thereby, the chain is thinned and the weight is reduced, the tensile strength is increased by thickening the chain sheet.

7 Claims, 6 Drawing Sheets

CHAIN STRUCTURE OF BICYCLES

BACKGROUND OF INVENTION

1. Field of the Invention

The present invention relates generally to a chain, and more particularly to a chain structure of bicycles.

2. Description of Related Art

People regarded bicycles as a riding tool in the past. As the world is advocating energy saving and carbon reduction, bicycle activity is prevailing increasingly. Taiwan is known as the kingdom of bicycle manufacturing, under the push of the government and voluntary associations, the bicycle recreation has become one of the healthful and recreational sports of our citizens.

The bicycle structure has a driving gear and a driven gear, a chain winds round the two gears to form a transmission gear, the pedal at the crank end arranged at the driving gear side end enables the driving gear to drive the chain and driven gear to rotate, rotating the wheel body installed on the driven gear shaft, so that the bicycle is driven to move forward. In terms of the required force for the bicycle structure, different gear ratios result in easy pedaling effect or high torque, and in the course of pedaling, when the pedal reaches the exact vertex of swiveling movement, a little ahead of middle part, the rider can apply a downward force easily, and this force can generate a quite effective torque to the driving gear.

Many factors can cause speed drop or laborious riding when the bicycle is travelling, such as upslopes, headwind or consumption of physical energy. In order to increase the riding efficiency and maintain travelling at uniform speed under different conditions, the gear change mechanism of bicycle is of greater importance. The bicycle structure has a driving gear and a driven gear, and a chain winds round the two gears to form a transmission gear. When the footsteps on the pedal at the crank end installed at the driving gear side end, the driving gear can drive the chain and driven gear to rotate, so that the wheel body installed on the driven gear shaft can rotate, and the bicycle obtains the power to move forward. The principle of speed changing system is to change the gear ratio, in the case of pedaling one turn, larger gear ratio represents longer forward travel distance, but more physical strength is consumed. Smaller gear ratio represents shorter forward travel distance, but it is labor-saving relatively. Therefore, the shift of gear ratio depends on the cyclist's condition, fast speed takes labor, and slow speed saves labor.

The bush and inner chain sheet of inner link and the pin and outer chain sheet of outer link of general chains are assembled by tight fit, the roller is installed on the bush of inner link with a clearance, there is a clearance between the pin of outer link and the bush of inner link, connecting the inner and outer links, the two clearances influence the smoothness of speed change and power transmission of bicycle chain.

Defects in current chain drive:
 1. Inapplicable to high-speed running, as the chain is heavy, it is likely to produce noise and vibration.
 2. Only applicable to power transmission between parallel axes, tilt is not allowed.
 3. Nonuniform transmission speed, unstable revolution.
 4. Installation and repair and maintenance are more difficult than belt and rope pulley transmission.
 5. Higher manufacturing and maintenance costs.

The detailed features and advantages of the present invention are described in the following implementation method, the content is enough to enable anybody familiar with related techniques to understand the technical content of the present invention and to implement it, and according to the content, claims and figures disclosed in this specification, anybody familiar with related techniques can easily understand the purposes and advantages of the present invention.

SUMMARY OF THE INVENTION

The fundamental purpose of the present invention is to reduce the chain width, the number of constituent parts and the chain weight without changing the material thickness.

In order to attain the aforesaid purposes, the present invention relates generally to a chain structure of bicycles, which comprises a plurality of rollers which define a mounting space, a plurality of chain sheets, the chain sheets are installed on both sides of the roller respectively. The chain sheet comprises a chain body, a first pivot joint part extending from one end of the chain body and to be arranged in the mounting space, a second pivot joint part horizontally extending from the other end of the chain body and installed on the roller with the first pivot joint part, wherein the first pivot joint part is in a horizontal position different from the chain body, the first pivot joint part defines a rotation space for placing the second pivot joint part of another chain sheet, so that the first pivot joint part and the second pivot joint part can rotate a preset angle in the rotation space, when the chain sheets are combined with the rollers respectively, the chain bodies remain on the same plane; and a plurality of chain rollers, which penetrate the second pivot joint part and the first pivot joint part respectively for connecting the roller to the chain sheets installed on both sides of the roller.

The structure defined in claim 1, wherein a restraining structure is defined between the chain body and the first pivot joint part.

According to an embodiment of the present invention, wherein the restraining structure comprises two limit parts horizontally extending from the chain body and a plane of rotation between the limit parts.

According to an embodiment of the present invention, wherein two limit pieces matching the limit parts are defined between the chain body and the second pivot joint part.

According to an embodiment of the present invention, wherein a rotation limit space is defined between the limit pieces and the limit parts.

According to an embodiment of the present invention, wherein the rotation angle of the preset angle subjected to the limit piece and the limit part on one side is 60°-70°.

According to an embodiment of the present invention, wherein the rotation angle of the preset angle subjected to the limit piece and the limit part on two sides is 120°-140°.

The secondary objective of the present invention is to increase the overall manufacturing efficiency, reduce the manufacturing cost, maintain market universality and improve the functionality in use.

DETAILED DESCRIPTION OF THE INVENTION

The implementation method of the present invention is described below with specific embodiments, the persons familiar with this technique can easily understand the other advantages and effects of the present invention from the content disclosed in this specification.

The structures, proportions and dimensions shown in the figures attached to this specification coordinate with the content disclosed in the specification, for the persons familiar with this art to understand and read, not for limiting the restriction conditions of the invention, so there is no technically substantial significance, any modification of structure, change of proportional relation or adjustment of dimensions shall fall in the coverage of the technical content disclosed in the present invention without influencing the available effects and attainable purposes of the present invention. Meanwhile the words "one", "two" and "upper" in this specification are used only for clear description, not for limiting the scope of implementation of the invention, the change or modification of relative relationship shall be regarded as the scope of implementation of the present invention without substantial modification of technical content.

Figure 1:
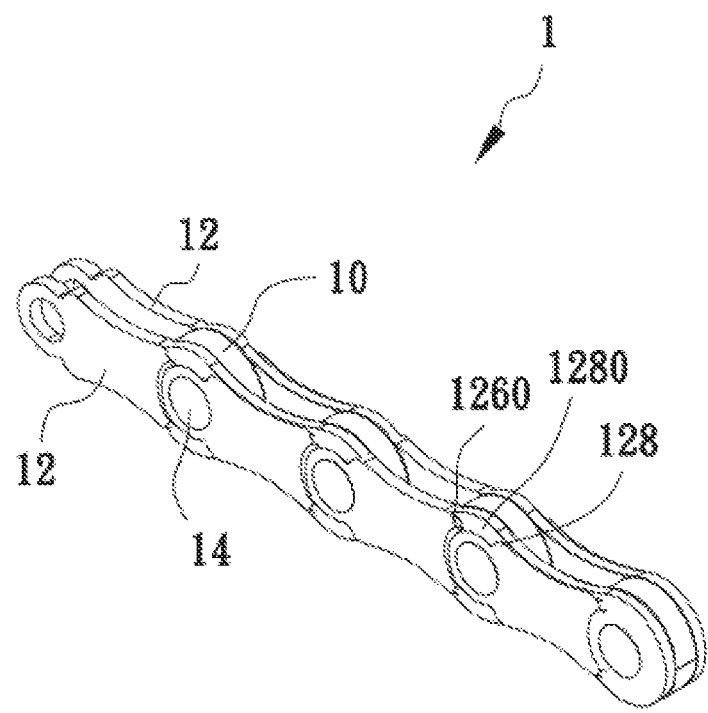
FIG. 1 is the three-dimensional diagram of the preferred embodiment of the present invention.
Figure 2:
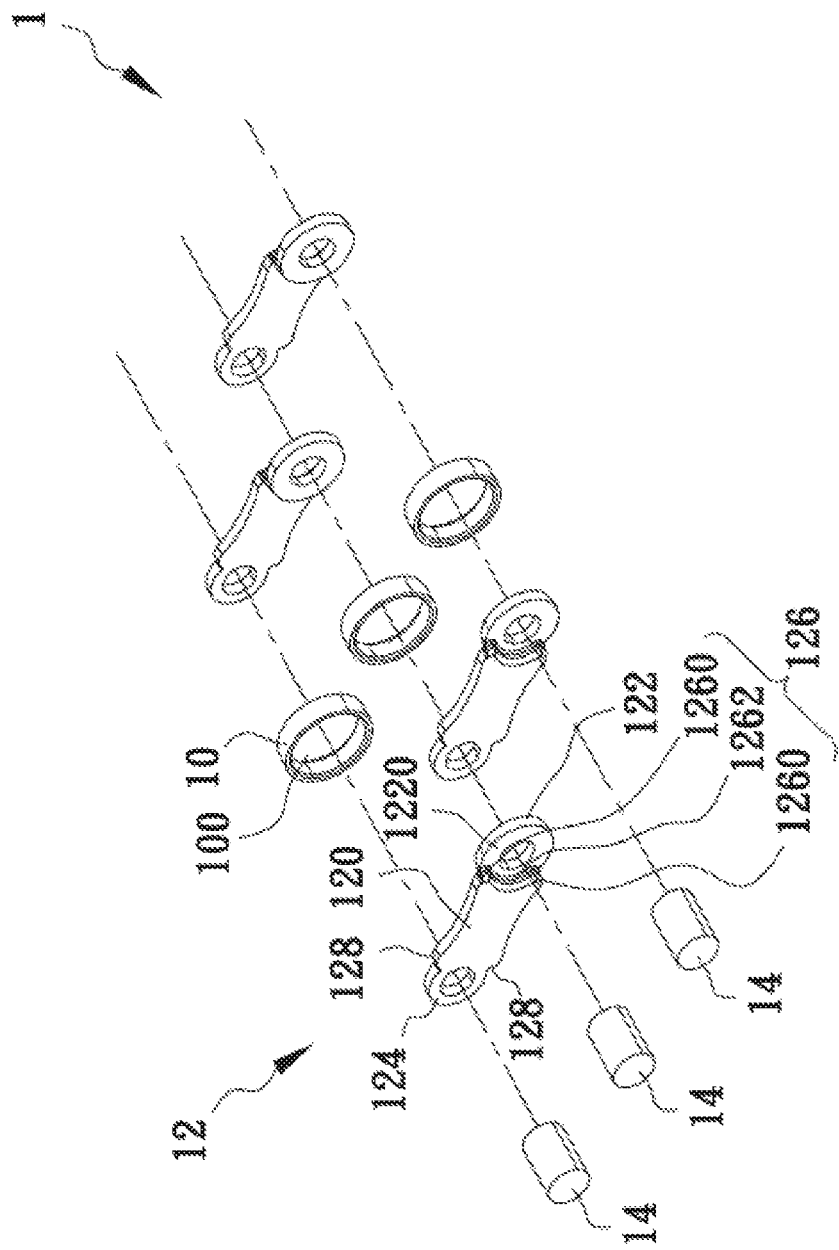
FIG. 2 is the three-dimensional exploded view of the preferred embodiment of the present invention.
Figure 3:
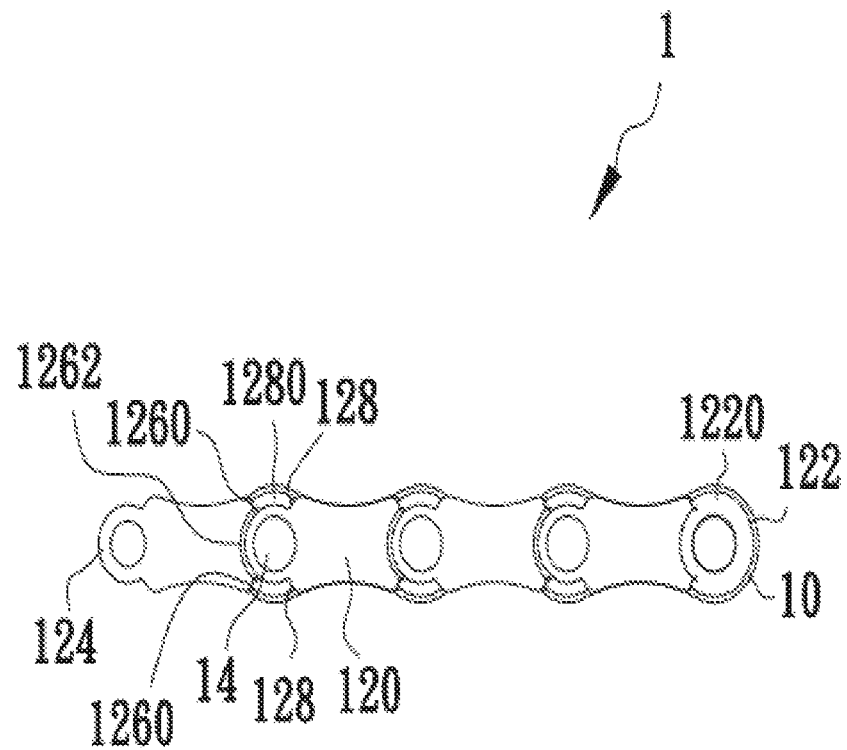
FIG. 3 is the schematic plan of the preferred embodiment of the present invention.

FIGS. 1 to 3 are the three-dimensional diagram, three-dimensional exploded view and schematic plan of the preferred embodiment of the present invention. The chain structure 1 of the present invention comprises a plurality of rollers 10, a plurality of chain sheets 12 and a plurality of chain rollers 14. Wherein the rollers 10 define a mounting space 100, each chain sheet 12 comprises a chain body 120, a first pivot joint part 122 extending from one end of chain body 120 and to be arranged in the mounting space 100, a second pivot joint part 124 horizontally extending from the other end of chain body 120, the second pivot joint part 124 is installed on the roller 10 with the first pivot joint part 122, wherein the first pivot joint part 122 is in a horizontal position different from the chain body 120, the first pivot joint part 122 defines a rotation space 1220, the rotation space 1220 is provided for placing the second pivot joint part 124 of another chain sheet 12, so that the first pivot joint part 122 and the second pivot joint part 124 can rotate a preset angle in the rotation space 1220, when the chain sheets 12 are combined with rollers 10 respectively, the chain bodies 120 remain on the same plane, the chain rollers 14 penetrate the second pivot joint part 124 and the first pivot joint part 122 respectively for connecting the roller 10 to the chain sheets 12 on both sides of roller 10.

A restraining structure 126 is defined between the aforementioned chain body 120 and the first pivot joint part 122, wherein the restraining structure 126 comprises two limit parts 1260 horizontally extending from the chain body 120 and a plane of rotation 1262 between the limit parts 1260 (a cambered structure for matching the second pivot joint part 124).

Two limit pieces 128 matching the limit parts 1260 are defined between the aforementioned chain body 120 and the second pivot joint part 124, wherein a rotation limit space 1280 is defined between the limit pieces 128 and limit parts 1260.

The rotation angle of the aforementioned preset angle subjected to unilateral limit piece 128 and limit part 1260 is 60°-70°, the optimal rotation angle is 65°.

The rotation angle of the aforementioned preset angle subjected to bilateral limit piece 128 and limit part 1260 is 120°-140°, the optimal rotation angle is 130°.

Figure 4:
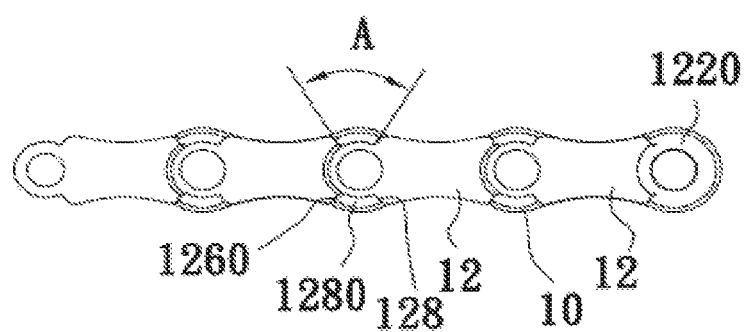
FIG. 4 is the schematic diagram of operating state of the rotation angle of preset angle subjected to unilateral limit piece and limit part.
Figure 5:
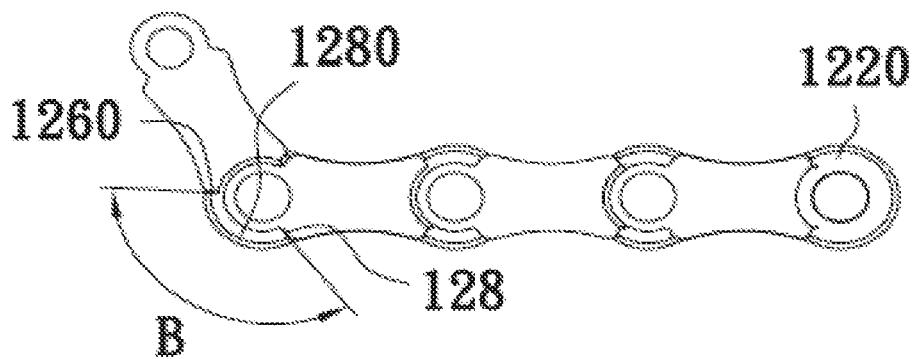
FIG. 5 is the schematic diagram of operating state of the rotation angle of preset angle subjected to bilateral limit piece and limit part.

FIGS. 4 and 5 show the schematic diagram of operating state of the rotation angle of the preset angle subjected to unilateral limit piece and limit part and the schematic diagram of operating state of preset angle subjected to bilateral limit piece and limit part. As shown in FIG. 4, taking two pairs of chain sheets 12 as an example, a pair of chain sheets 12 is on both sides of roller 10 respectively, two pairs of chain sheets 12 share a roller 10, wherein the first pivot joint part 122 of a pair of chain sheets 12 is arranged in the mounting space 100, as the first pivot joint part 122 is in a horizontal position different from chain body 120, the first pivot joint part 122 defines a rotation space 1220, this rotation space 1220 is provided for the second pivot joint part 124 of another pair of chain sheets 12, the chain roller 14 penetrates the first pivot joint part 122 and second pivot joint part 124, so that the chain sheets 12 rotate round the roller 10.

It is noteworthy that FIG. 4 takes unilateral bending as an example, as the restraining structure 126 defined between the chain body 120 and the first pivot joint part 122 of chain sheet 12 has two limit parts 1260, and each limit part 1260 corresponds to the limit piece 128 between chain body 120 and the second pivot joint part 124 of another chain sheet 12, the distance between limit part 1260 and limit piece 128 defines a rotation limit space 1280, with the rotation space 1220 defined by the first pivot joint part 122, they are enough for the connected chain sheets 12 to rotate within a preset angle A on one side, the preset angle A is 60°-70°, and the optimal rotation angle is 65°.

FIG. 5 shows in bilateral rotation, the rotation limit space 1280 defined by the distance between the aforesaid limit part 1260 and limit piece 128 and the rotation space 1220 defined by the first pivot joint part 122 are enough for the connected chain sheets 12 to rotate within a preset angle B on two sides, the preset angle B is 120°-140°, and the optimal rotation angle is 130°.

Figure 6:
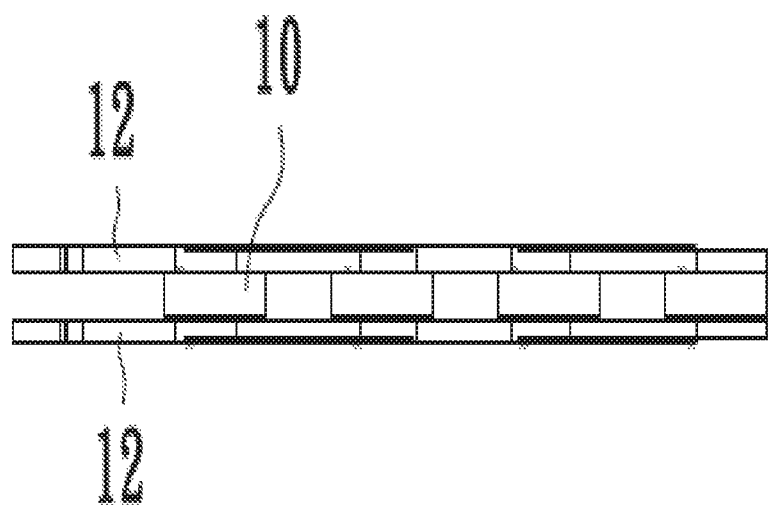
FIG. 6 is the top view of the preferred embodiment of the present invention.

FIG. 6 shows the top view of the preferred embodiment of the present invention. It is observed when the chain sheets 12 of chain structure 1 are combined with rollers 10, the chain bodies 120 remain on the same plane, so that total number of chain sheets 12 is reduced from 4 to 2, the parts cost, assembly cost and mold development cost are reduced.

As stated above, the present invention gives the chain structure 1 the following advantages:

1. Manufacture advantage: the chain sheet is made by metal stamping, the roller is machined by powder metallurgy, the fixed pin is turned by round bar, automated assembly, the process is approximately the same as the existing machining process.
2. Cost advantage: the number of chain sheets is reduced from 4 to 2, the parts cost, assembly cost and mold development cost can be reduced, in comparison to the chain of the same length, the weight is reduced, favorable for chain manufacturer and users.
3. Market advantage: the number of gear ratios is increased without influencing the existing ratchet base specification, it is unnecessary to change odd shared parts, there will be high market acceptance.

4. Function advantage: when the chain enters or departs from the gear, the roller can reduce the slide between chain wheel and roller, this is one of the reasons for high efficiency of roller chain, enlarging the roller wrapping chain sheet can exempt the mechanical and kinetic energy losses induced by the friction between chain sheet and chain wheel.

Although the invention has been explained in relation to its preferred embodiment, it is to be understood that many other possible modifications and variations can be made without departing from the spirit and scope of the invention as hereinafter claimed.

The invention claimed is:

1. A chain structure of bicycles, comprising
a plurality of rollers, which define a mounting space;
a plurality of chain sheets, the chain sheets are installed on both sides of the roller respectively; the chain sheet comprises a chain body, a first pivot joint part extending from one end of the chain body and to be arranged in the mounting space, a second pivot joint part horizontally extending from the other end of the chain body and installed on the roller with the first pivot joint part, wherein the first pivot joint part is in a horizontal position different from the chain body, the first pivot joint part defines a rotation space for placing the second pivot joint part of another chain sheet, so that the first pivot joint part and the second pivot joint part can rotate a preset angle in the rotation space, when the chain sheets are combined with the rollers respectively, the chain bodies remain on the same plane; and
a plurality of chain rollers, penetrating the second pivot joint part and the first pivot joint part for connecting the roller to the chain sheets on both sides of the roller.

2. The chain structure of bicycles defined in claim 1, wherein a restraining structure is defined between the chain body and the first pivot joint part.

3. The chain structure of bicycles defined in claim 2, wherein the restraining structure comprise two limit parts horizontally extending from the chain body and a plane of rotation between the limit parts.

4. The chain structure of bicycles defined in claim 3, wherein two limit pieces matching the limit parts are defined between the chain body and the second pivot joint part.

5. The chain structure of bicycles defined in claim 4, wherein a rotation limit space is defined between the limit pieces and the limit parts.

6. The chain structure of bicycles defined in claim 1, wherein the rotation angle of the preset angle subjected to unilateral limit piece and limit part is 60°-70°.

7. The chain structure of bicycles defined in claim 1, wherein the rotation angle of the preset angle subjected to bilateral limit piece and limit part is 120°-140°.

* * * * *